United States Patent

Nakamura et al.

[11] Patent Number: 5,890,732
[45] Date of Patent: Apr. 6, 1999

[54] SIDE-IMPACT AIR BAG SYSTEM

[75] Inventors: Junichi Nakamura, Anjo; Tsutomu Ookochi, Okazaki; Noritaka Nagayama, Okazaki; Mikiharu Shimoda, Okazaki, all of Japan; Masanobu Hatta, deceased, late of Okazaki, Japan, by Tosiyasu Hatta, Setuko Hatta, legal representatives

[73] Assignee: Mitsubishi Jidosha Kogyo Kabushiki Kaisha, Tokyo, Japan

[21] Appl. No.: 835,008

[22] Filed: Apr. 7, 1997

[30] Foreign Application Priority Data

Apr. 8, 1996 [JP] Japan .................................... 8-085177

[51] Int. Cl.⁶ .................................................. B60R 21/24
[52] U.S. Cl. ........................................ 280/729; 280/730.2
[58] Field of Search ................................ 280/729, 730.2, 280/743.1

[56] References Cited

U.S. PATENT DOCUMENTS

| | | | |
|---|---|---|---|
| 5,324,072 | 6/1994 | Olson et al. | 280/730.2 |
| 5,524,924 | 6/1996 | Steffens, Jr. et al. | 280/730.2 |
| 5,586,782 | 12/1996 | Zimmerman, II et al. | 280/730.2 |
| 5,692,774 | 12/1997 | Acker et al. | 280/729 |
| 5,718,450 | 2/1998 | Hurford et al. | 280/730.2 |
| 5,722,685 | 3/1998 | Eyrainer | 280/729 |

FOREIGN PATENT DOCUMENTS

| | | |
|---|---|---|
| 0653335A | 5/1995 | European Pat. Off. . |
| 0714818A | 6/1996 | European Pat. Off. . |
| 4430412C | 10/1995 | Germany . |
| 19517764A | 11/1996 | Germany . |
| 2249740A | 10/1990 | Japan . |
| 450052A | 2/1992 | Japan . |
| 4356246A | 12/1992 | Japan . |
| 5139232A | 6/1993 | Japan . |
| 6227348A | 8/1994 | Japan . |

*Primary Examiner*—Kenneth R. Rice

[57] ABSTRACT

In a side impact air bag system, a bag is formed of a main body opposing an abdomen portion of a passenger and an upper inflation unit opposing a chest portion of the passenger, a tip portion in the longitudinal direction of the upper inflation unit is deleted and a connection of a gas intake portion to an inflator is shortened to reduce a length of the upper inflation unit than the length of the main body. This reduces the length of the upper inflation unit to be shorter than the main body when the bag is inflated to relax the shock to the chest portion of the passenger when the bag is inflated, thereby positively inflating the bag in the narrow space between the vehicle body and the passenger's seat without excessively increasing the shock to the chest portion of the passenger.

13 Claims, 4 Drawing Sheets

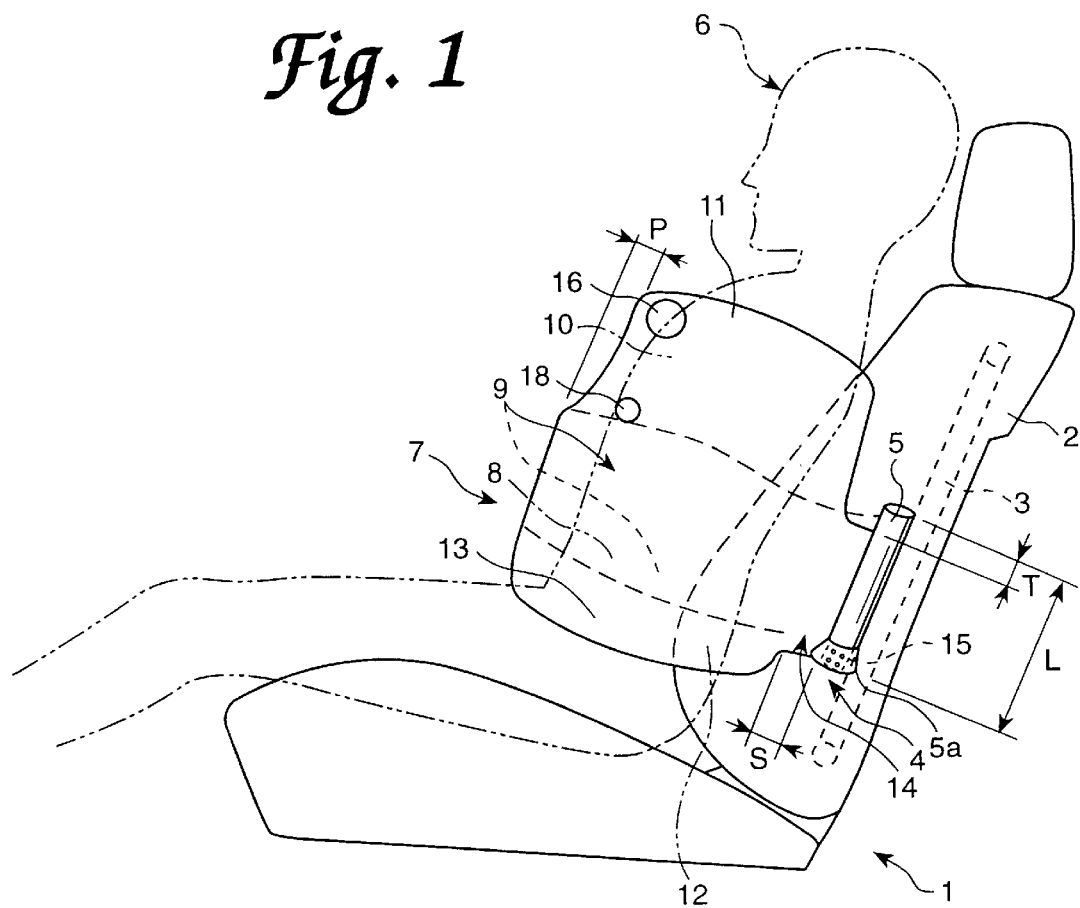
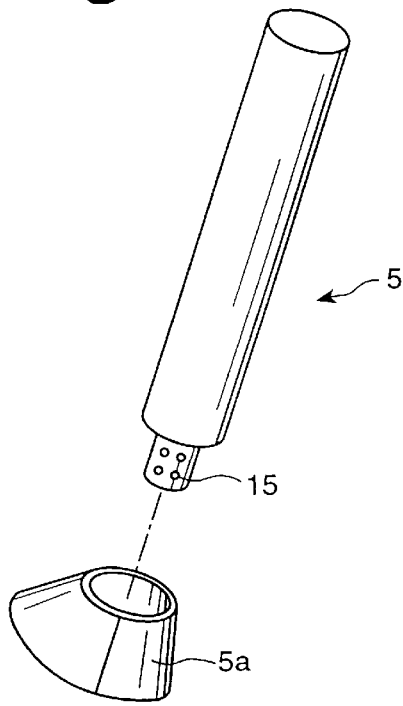
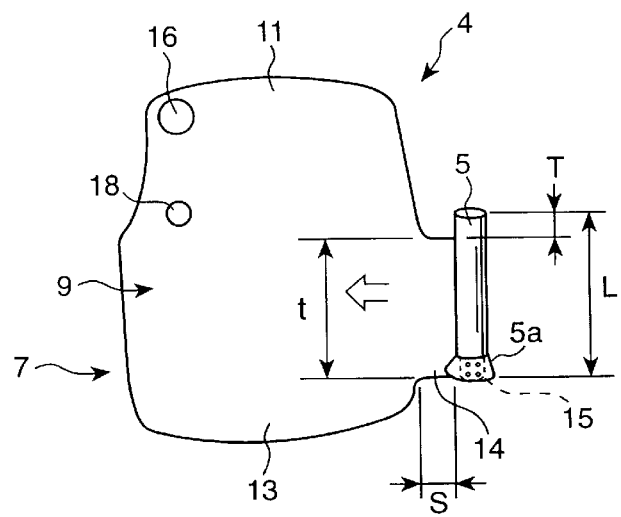

SIDE-IMPACT AIR BAG SYSTEM

FIELD OF THE INVENTION

This invention relates to an air bag for protecting a passenger (or a driver) when a shock is applied externally to the side of a vehicle.

BACKGROUND ART

When a shock is applied externally to the side of the vehicle due to a side impact or the like, the vehicle door or the vehicle structure may be deformed by the impact force depending on the magnitude of the shock. In order to relax the shock force to the passenger due to the deformation, various types of air bag are proposed which are inflated between the lateral face and the passenger when a side impact occurs, so that the shock force exerted on the passenger is absorbed by the air bag (e.g. Japanese Patent Laid-open Publication (OPI) 4-50052, Japanese OPI 4-356246, and so on).

A heretofore proposed side impact air bag system has an air bag folded up together with a gas generating device, both installed inside a vehicle seat (mainly in the seat back) to maintain the relative position to the passenger in a constant value, and is provided with detection means for detecting a side impact to blow the gas from the gas generating device. When a side impact is detected by the detection means, a gas is momentarily blown out from the gas generating device into the air bag to inflate the air bag towards the front side of the vehicle so that the air bag lies between the side of the vehicle and the passenger. By the air bag lying between the side of the vehicle and the passenger in the vehicle compartment, a shock to the passenger by a deformed door and the like is absorbed to protect the passenger.

In the conventional side impact air bag system, since the bag inflation direction is almost perpendicular to the input at collision, it is necessary to inflate the air bag momentarily by a high pressure in order to positively inflate in a narrow space between the vehicle body and the passenger. However, the part opposing the chest portion and the part opposing the abdomen portion of the passenger are inflated with almost the same width, the abdomen portion and the chest portion are applied with a same pressure when the bag is inflated, the shock to the chest portion is relatively high, and a desired shock absorption is not achieved.

With a view to eliminate the above prior art problems, a primary object of the present invention is to provide a side impact air bag system which can be positively inflated in a narrow space between the vehicle body and the passenger.

Another object of the present invention is to provide a side impact air bag system which is improved in restraining of the passenger.

SUMMARY OF THE INVENTION

In accordance with the present invention, which attains the above object, there is provided a side impact air bag system having a bag main body inflated between the side of a vehicle and a passenger by a gas blown out from a gas generating device, the bag main body comprising, a first portion opposing an abdomen portion of the passenger when inflated; and a second portion opposing a chest portion of the passenger when inflated; wherein a width in a lateral direction of vehicle at a boundary of the first portion and the second portion is formed narrower than a width in the lateral direction of vehicle in the first portion.

There is also provided according to the present invention a side impact air bag system including a bag main body inflated between the side of a vehicle and a passenger by a gas blown out from a gas generating device, the bag main body comprising a first portion opposing an abdomen portion of the passenger when inflated; and a second portion opposing a chest portion of the passenger when inflated; wherein a width in a lateral direction of vehicle in the second portion is formed narrower than a width in the lateral direction of vehicle in the first portion.

In the side impact air bag system, an upper portion of the second portion at a side away from the gas generating device in a longitudinal direction of the vehicle is shifted towards the gas generating device by a predetermined length relative to an end of the first portion at a side away from the gas generating device.

Further, in the side impact air bag system, the bag main body includes a regulating member for regulating a width in a vehicle width direction of the boundary.

Still further, in the side impact air bag system, the bag main body includes a regulating member for regulating a width in a lateral direction of vehicle in the second portion.

Yet further, in the side impact air bag system, the bag main body a gas intake portion for suppressing diffusion of the gas blown out from the gas generating device; and the bag main body and the gas generating device are connected through the gas intake portion. The gas intake portion is formed as a passage having a predetermined height and a predetermined length and having.

Yet further, in the side impact air bag system, the gas intake portion has a narrowed portion for restricting a flow of the gas blown out from the gas generating device.

Yet further, the bag main body is provided with an upper inflation unit which inflates in an upward direction.

Yet further, the bag main body is provided with a lower inflation unit which inflates in a downward direction.

BRIEF DESCRIPTION OF THE DRAWINGS

FIG. 1 is a schematic side view showing an embodiment of the side impact air bag system according to the present invention;

FIG. 2 is a schematic exploded perspective view of an inflator;

FIG. 3 is a schematic side view of the bag;

DESCRIPTION OF THE PREFERRED EMBODIMENTS

Figure 4A:
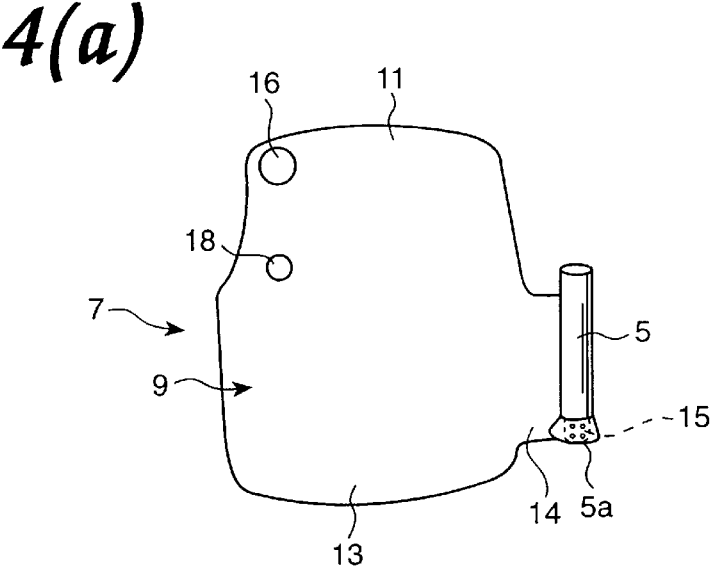
FIG. 4 (a)–(c) are schematic views of a folded bag.
Figure 6:
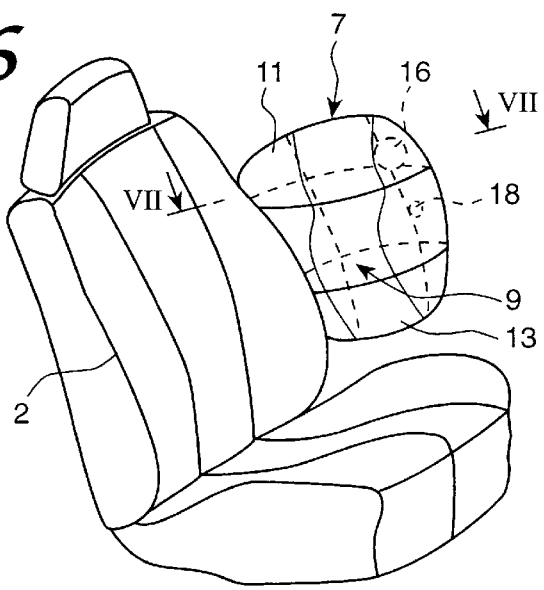
FIG. 6 is a schematic perspective view when the bag is inflated.
Figure 7:
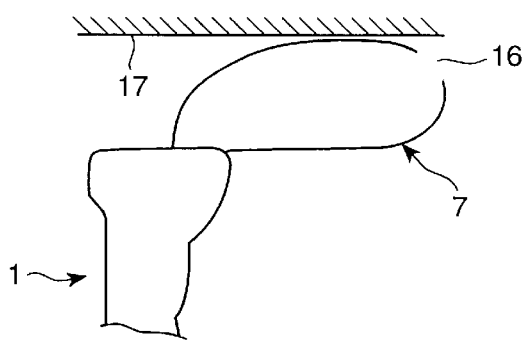
FIG. 7 is a schematic cross sectional view taken along line VII—VII in FIG. 6.

Preferred embodiments of the side impact air bag system according to the present invention will be described with reference to the drawings. FIG. 1 is a schematic side view showing an embodiment of the side impact air bag system according to the present invention; FIG. 2 is a schematic exploded perspective view of an inflator; FIG. 3 is a schematic side view of the bag; FIG. 4 is a schematic view of a folded bag; FIG. 5 is a schematic view showing the relationship between the side of the vehicle and the passenger as viewed from the rear of the vehicle when the bag is inflated; FIG. 6 is a schematic perspective view when the bag is inflated; and FIG. 7 is a schematic cross sectional view taken along line VII—VII in FIG. 6.

As shown in FIG. 1, a frame 3 of a seat back 2 in a vehicle seat 1 is provided with a side impact air bag system 4. The side impact air bag system 4 has a bag 7 which is inflated between the side of the vehicle and a passenger 6 by a gas blown from an inflator 5 as a gas generating device. The bag 7 comprises a main body 9 for covering a side of an abdomen portion 8 of the passenger 6 when inflated; an upper inflation unit 11 as an inflation unit which, when inflated, protrudes upward above the main body 9 to cover the side surface of a chest 10 (the rib portion) of the passenger 6; and a lower inflation unit 13 for covering the lower part of the abdomen portion 8 and part of a waist portion 12 of the passenger 6. The bag 7 is connected to the inflator 5 through a gas intake portion 14 for suppressing diffusion of the gas blown out from the inflator 5.

As shown in FIGS. 1 and 2, the inflator 5 is cylindrically formed and charged with compressed gas, and blowing ports 15 for blowing the gas is provided at the lower portion of the inflator 5. The blowing ports 15 are located at a height approximately the same as the abdomen portion 8 of the passenger 6, and an umbrella-formed guide member 5a is provided at the lower portion of the inflator 5 for covering the blowing ports 15 and guiding the blown gas downward, that is, to the lower inflation unit 13. By the guide member 5a, the gas blown out from the blowing ports 15 is positively guided to the lower inflation unit 13 (lower portion), thereby positively guiding the gas to the part of the bag 7 opposing the abdomen portion 8 of the passenger 6.

Further, the guide member 5a is attached to the lower portion of the inflator 5 to guide the gas blown out from the blowing ports 15 to the lower inflation unit 13 and to the part of the bag 7 opposing the abdomen portion 8 of the passenger 6. However, alternatively, it is also possible to omit the guide member 5a depending on the position of the blowing ports 15. Still further, the lower inflation unit 13 of the bag 7 can also be formed to cover the entire waist portion 12 of the passenger 6.

The upper inflation unit 11 of the bag 7 is provided with a first vent hole 16 as internal pressure adjusting means so that the gas is appropriately discharged from the first vent hole 16 to obtain an appropriate pressure inside the bag 7 for absorbing the shock when the bag 7 is inflated. The first vent hole 16, as shown in FIGS. 6 and 7, is formed at a position away from the inflator 5 when the bag 7 is inflated and on the upper portion (upper inflation unit 11) on the side surface opposite to the passenger 6. Furthermore, the first vent hole 16 is formed at a position where the bag 7, when inflated, does not make contact with a door trim 17 as a vehicle compartment structural member, that is, at the tip portion where the inflated bag 7 is R-shaped when inflated.

Further, a second vent hole 18 of a smaller diameter than the first vent hole 16 is formed in the upper inflation unit 11 in the vicinity of the boundary of the main body 9 of the bag 7 and the upper inflation unit 11, the second vent hole 18 is also formed at a position where the bag 7, when inflated, does not make contact with the door trim 17 as a vehicle compartment structural member, that is, at the tip portion where the inflated bag 7 is R-shaped when inflated.

In the above-described embodiment, the first vent hole 16 is described as an example of internal pressure adjusting means. However, it is not limited to the first vent hole 16, but it is possible to use a system which maintains the pressure of the position in the bag 7 opposing the chest portion 10 of the passenger 6 at a smaller value when the bag 7 is being inflated.

Next, the gas intake portion 14 will be described. As shown in FIG. 3, the gas intake portion 14 is formed at a position lower by a width T from the top end of the inflator 5 and has a width t from the bottom end of the inflator 5. Further, the gas intake portion 14 extends toward the main body 9 by a predetermined distance S and continues to the bag 7. In other words, in the gas intake portion 14 of the bag 7, the portion of the bag 7 connecting the bag 7 to the inflator 5 is shorter than the length of the inflator 5. With the gas intake portion 14, the gas from the inflator 5 is blown forward to the position of the main body 9 without diffusion.

Figure 8:
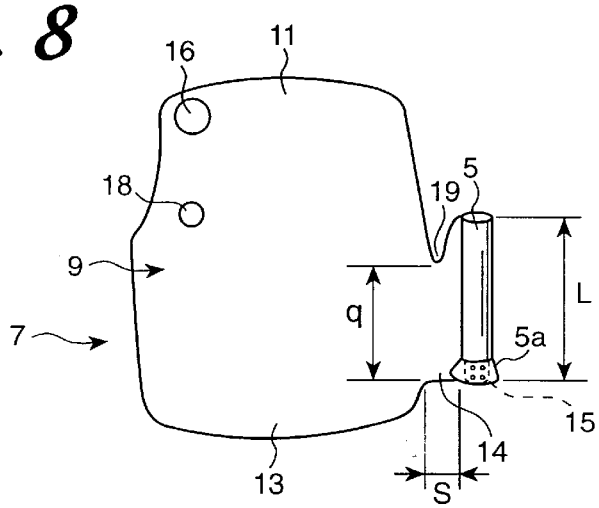
FIG. 8 is a schematic side view showing another embodiment of a gas intake portion.

Alternatively, the gas intake portion 14 may be formed such that the width t is extended to a length L in the vertical direction of the inflator 5. Also in this case, the gas intake portion 14 extends toward the main body 9 by a predetermined distance S and continues to the bag 7. Further, as shown in FIG. 8 showing the side view of the bag 7, a narrowed portion 19 having a width q shorter than the vertical length L of the inflator 5 may be provided so that the gas intake portion 14 is connected to the top and bottom ends of the inflator 5 and extended by the predetermined distance S in a horizontal direction. The position of the narrowed portion 19 can be appropriately set to suppress diffusion of the gas blown out from the inflator 5 and regulate the blowing of the gas to an optional direction.

On the other hand, as shown in FIG. 1, the tip in the longitudinal direction (direction separating from the inflator 5) of the upper inflation unit 11 of the bag 7 is made shorter by a length P than the main body 9. The length of the upper inflation unit 11 is shortened as compared with the length of the main body 9 in the direction away from the inflator 5 by shortening the connection of the gas intake portion 11 to the inflator 5 and by cutting the tip of the upper inflation unit 11. By shortening the length of the upper inflation unit 11 as compared with the main body 9, as shown in FIG. 5, a width h of the upper inflation 11 becomes narrower than a width H of the main body 9 when the bag 7 is inflated.

Figure 9A:
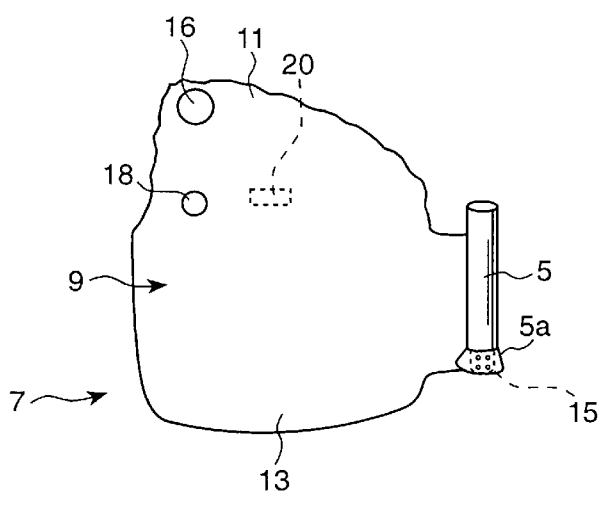
FIGS. 9(a)–(b) are schematic views for explaining an embodiment of a bag having a reduced width in the upper inflation unit by a strap.
Figure 9B:
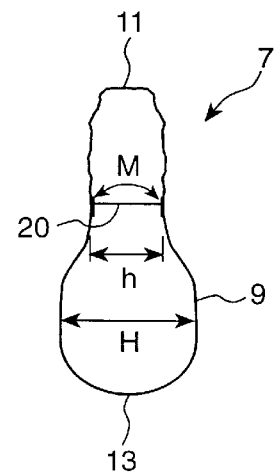

As a structure of the member for narrowing the width of the upper inflation unit 11, as shown in FIG. 9(a) showing a side view of the bag 7 and in FIG. 9(b) showing a cross sectional view in FIG. 9(a), it is possible to attach both ends of a strap 20 to the inner surface of the upper inflation unit 11. In this case, a length M of the strap 20 is shorter than the width H when the main body 9 is inflated (FIG. 9(b)). Thus, in the upper inflation unit 11, inflation in the width direction is suppressed by the strap 20, and the width h, when the upper inflation unit 11 is inflated, is narrower than the width H of the main body 9.

In the above-described embodiment, the width of the upper inflation unit 11 when inflated is narrower than the width of the main body 9. However, at least the width of the boundary of the upper inflation unit 11 and the main body 9 may be narrower than the main body.

Folding condition of the bag 7 will be described with reference to FIG. 4. As shown in FIGS. 4(a) and (b), the upper inflation unit 11 and the lower inflation unit 13 are individually folded and vertically contained within the main body 9, so that the folded cross section is nearly U-shaped. In this case, the first vent hole 16 is contained inside the main body 9. As shown in FIG. 4(c), after the upper inflation unit 11 and the lower inflation unit 13 are folded in the main body 9, the bag 7 is folded successively in bellows towards the inflator 5.

Figure 10A:
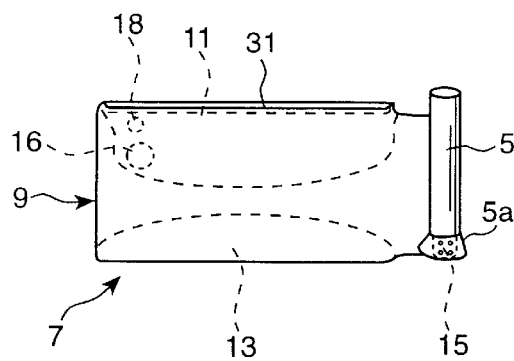
FIGS. 10(a)–(b) are schematic views for explaining an embodiment of a bag temporarily sewn at the upper edge of the bag main body.

Further, as shown in FIGS. 10(a) and (b), it is possible to temporarily sew the upper edge of the main body 9 of the position where the upper inflation unit 11 is folded inside the main body 9 to connect as a sewn portion 31 (separates above a predetermined pressure). By connecting the upper edge of the main body 9 as the sewn portion 31, upward diffusion of the gas from the inflator 5 is suppressed when the bag 7 is inflated, and the gas blown out from the inflator 5 is ejected towards the position of the main body nearly of the front side. Still further, it is also possible to directly join the upper edge of the main body 9 with an adhesive or the like rather than by sewing.

The bag 7 contained as above is inflated by the gas blown out from the inflator 5 when a side impact is detected by detection means (not shown).

Operation of the side impact air bag system 4 of the above arrangement will be described.

When a side impact of the vehicle is detected by detection means (not shown), the gas in the inflator 5 is blown out from the blowing ports 15 to begin inflation of the bag 7. The gas blown out from the blowing ports 15 is guided by the guide member 5a to the lower portion of the bag 7 and diffusion is suppressed by the gas intake portion 14 to be ejected towards the front side. As a result, first, the part of the main body 9 of the bag 7 (part opposing the abdomen portion 8 of the passenger 6) is momentarily inflated by a high pressure (condition from FIG. 4(c) to (b) and see the dotted line portion in FIGS. 1 and 5), and the main body 9 enters between the door trim 17 or the arm rest 21 and the passenger 6.

By the entry of the main body 9 between the door trim 17 or the arm rest 21 and the passenger 6, the abdomen portion having a higher shock load resistance than the chest portion 10 is pressed to move the passenger 6 away from the door trim 17 or the arm rest 21. This presses the passenger 6 in the same direction of the movement into the vehicle compartment of the door trim 17 (arm rest 21) at side impact, thereby relaxing the relative velocity to the deformation.

Figure 10B:
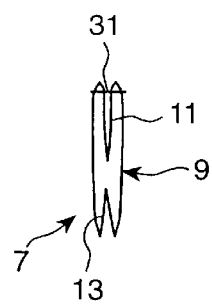

Further, as shown in FIG. 10, by joining the upper edge of the main body 9 by the sewn portion 31, diffusion of the blown gas is suppressed even further, which is combined with the suppressing action by the gas intake portion 14 to positively eject the gas to the front side, and inflation of the part of the bag 7 at the desired position, that is, the part opposing the abdomen portion 8.

By guiding the gas blown out from the blowing ports 15 of the inflator 5 downward by the guide member 5a and by suppressing diffusion of the gas by the gas intake portion 14, the main body 9 opposing the abdomen portion 8 which is higher in shock load resistance than the chest portion 10, in other words, the desired portion of the bag can be positively inflated between the door trim 17 (arm rest 21) and the passenger 6. This inflates the bag 7 in the narrow space momentarily by a high pressure, thereby relaxing the relative velocity with respect to the movement of the vehicle structural members into the vehicle compartment.

Figure 4B:
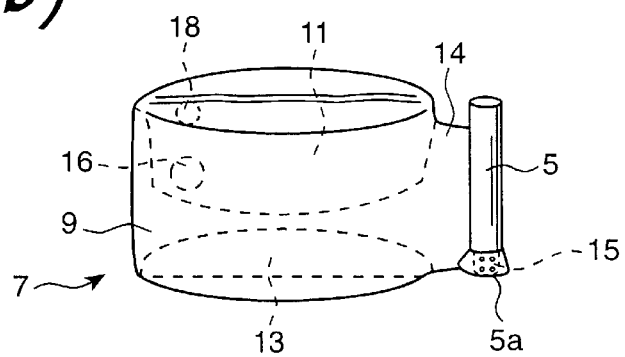
Figure 4C:
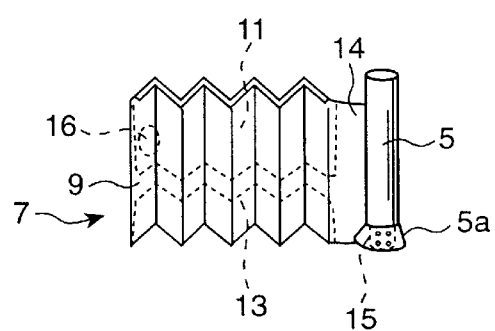
Figure 5:
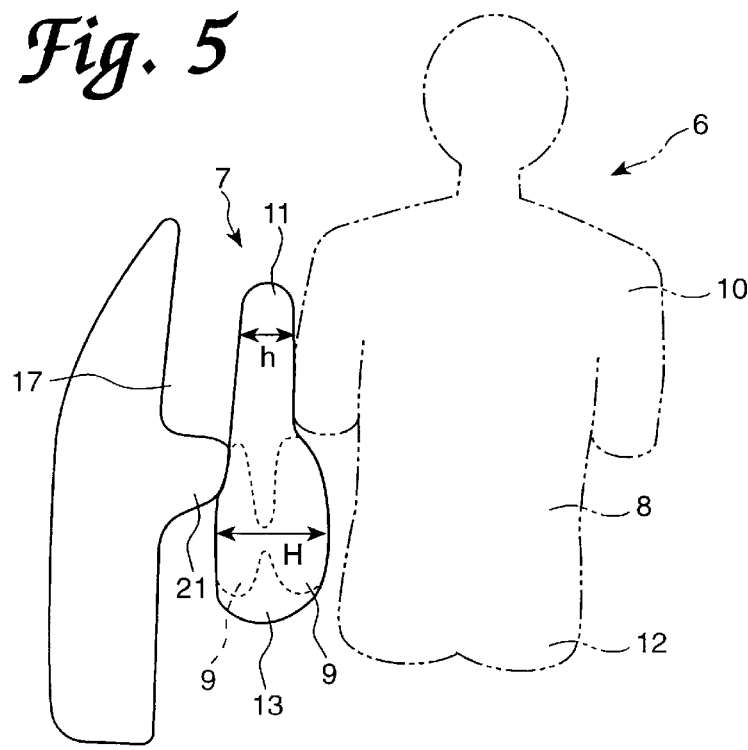
FIG. 5 is a schematic rear view showing the relationship between the side of the vehicle and the passenger when the bag is inflated.

Next, when the gas is continuously blown from the blowing ports 15 of the inflator 5 into the bag 7, the upper inflation unit 11 and the lower inflation unit 13 are inflated in upward and downward directions, respectively, from the inside of the main body 9 (see condition from FIG. 4(b) to (a) and the dotted line portion of FIGS. 1 and 5), and the upper inflation unit 11 is inflated between the door trim 17 and the chest portion 10 of the passenger 6. Further, the lower inflation unit 13 is inflated between the door trim 17 and part of the waist portion 12 of the passenger 6.

At this moment, since the upper inflation unit 11 and the lower inflation unit 13 are inflated in upward and downward directions respectively, they are inflated without interfering with the door trim 17 or the arm rest 21. Further, as shown in FIGS. 6 and 7, since the first vent hole 16 and the second vent hole 18 are formed at the tip portion which becomes R-shaped when the bag 7 is inflated, the upper inflation unit 11 is inflated without closing the first vent hole 16 and the second vent hole 18 by the door trim 17 or the arm rest 21. This maintains the gas blowing appropriately to obtain an appropriate pressure inside the bag 7.

In the process of inflating the upper inflation unit 11, the internal volume of the bag 7 is increased as the upper inflation unit 11 is inflated from the main body 9, and the gas is discharged from the second vent hole 18 in the predetermined condition, thereby obtaining an appropriate pressure to absorb the shock. Further, in the process of inflating the upper inflation unit 11, discharging of gas is carried out from the second vent hole 18 in the vicinity of the boundary of the main body 9 and the upper inflation unit 11, that is, in the vicinity of the part opposing the lower portion of the chest portion (the lowest rib). Still further, when the bag 7 is fully inflated, since the connection of the gas intake portion 14 to the inflator 5 is shortened and the length of the upper inflation unit 11 is shortened compared with the main body 9, as shown in FIG. 5, the width h of the upper inflation unit 11 becomes narrower than the width H of the main body 9.

Consequently, since an appropriate pressure for absorbing the shock is produced between the door trim 17 and the chest portion 10 which is lower in shock load resistance than the abdomen portion 8, and the upper inflation unit 11 having the reduced width inflates, the bag 7 can be inflated without exerting a shock on the chest portion to absorb the shock force due to the movement of the door trim 17 (arm rest 21) in the direction of the vehicle compartment. Further, gas in the vicinity of the boundary of the main body 9 and the upper inflation unit 11 is discharged, thereby relaxing the shock at the time the bag 7 begins to contact with the lower portion of the chest portion 8 (the lowermost rib).

Yet further, as shown in FIG. 9, even when the width h of the upper inflation unit 11 is made smaller than the width H of the main body 9 by using the strap 20, the bag 7 can be inflated similarly without exerting a high shock on the chest portion 10, thereby absorbing the shock force to the deformation of vehicle body structural members.

Since, in the above-described side impact air bag system 4, the gas from the inflator 5 is blown towards the lower portion of the bag 7 and diffusion of the gas is suppressed by the gas intake portion 14, when a side impact occurs, inflation of the bag 7 is begun by a high pressure from the part of the main body 9 opposing the abdomen portion 8 which is higher in shock load resistance than the chest portion 10. In other words, the bag 7 inflates from a portion other than the part opposing the chest portion 10 having lower shock load resistance, so that the bag 7 contacts with the abdomen portion 8 and does not make contact with the chest portion 10 during inflation under high pressure. Therefore, the bag 7 can be momentarily and positively inflated in the narrow space between the door trim 17 (arm rest 22) and the passenger 6 to press the passenger 6 toward the inside of the compartment, and thereby the relative velocity with respect to the movement of the door trim 17 (arm rest 22) towards the vehicle compartment can be relaxed.

Yet further, after the main body 9 opposing the abdomen portion 8 is inflated, when inflation of the upper inflation unit 11 from the main body 9 begins, since while gas discharge in the vicinity of the boundary of the main body 9 and the upper inflation unit 11 is carried out by the second vent hole 18 in association with inflation of the upper inflation unit 11, gas is discharged from the first vent hole 16 in the predetermined condition, when the upper inflation unit 11 is inflated from the inside of the main body 9, the upper inflation unit 11 having a smaller width than that of the main body 9 is inserted between the door trim 17 and the chest portion 10 with a slightly reduced internal pressure of the upper inflation unit 11. Therefore, the internal pressure of the upper inflation unit 11 is appropriately adjusted, so that the bag 7 can be inflated without applying a high shock to the chest portion 10 and the shock force due to the movement of the door trim 17 into the vehicle compartment be absorbed.

Yet further, since the upper inflation unit 11 and the lower inflation unit 13 are inflated in the vertical direction from the condition folded within the main body 9, there is no danger of the upper inflation unit 11 and the lower inflation unit 13 interfering with the door trim 17 or the arm rest 21, and inflation of the bag 7 is not disturbed. Yet further, since the first vent hole 16 and the second vent hole 18 are provided at positions not affected by deformation of the door trim 17, the first vent hole 16 and the second vent hole 18 will not be closed even if the door trim 17 is deformed towards the inside of the vehicle compartment. Therefore, gas discharge at inflation is not disturbed, and the desired internal pressure can always be obtained.

As described above, the inflation direction of the main body 9 can be regulated towards the abdomen portion 8 into the desired condition, and the restraining condition of the passenger 6 can be improved. Further, gas blowing direction from the inflator 5 is regulated by the gas intake portion 14, so that blowing of high pressure gas to the upper inflation unit 11 opposing the chest portion 10 is prevented, and the restraining condition of the passenger 6 can be improved.

Yet further, the internal pressure of the bag 7 is appropriately adjusted by means of the first vent hole 16 and the second vent hole 18, and the width of the upper inflation unit 11 is narrowed compared with the main body 9, so that the bag 7 can be inflated without exerting a high shock on the chest portion 10. Since the first vent hole 16 and the second vent hole 18 will not be closed by vehicle body structural members, the desired internal pressure is always obtained and the restraining condition of the passenger 6 will not be deteriorated. Still further, by inflating the upper inflation unit 11 and the lower inflation unit 13 in vertical directions, a danger of the bag 7 interfering with the door trim 17 or the arm rest 21 at inflation can be eliminated.

Since, in the side impact air bag according to the present invention, the bag is connected to the gas generating device through the gas intake portion for suppressing diffusion of the gas blown out from the gas generating device, and diffusion of the gas is suppressed by the gas intake portion, the blowing direction of the gas can be regulated so that after inflation of the bag begins from the part opposing the abdomen portion which is higher in load resistance than the chest portion, the bag is contacted with the chest portion to absorb the shock force. As a result, inflation of the bag can be regulated in the desired condition, thereby improving the restraint of the passenger.

What is claimed is:

1. A side impact air bag system having an air bag inflated between the side of a vehicle and a passenger by a gas blown out from a gas generating device, said air bag comprising:
    a first portion opposing an abdomen portion of the passenger when inflated; and
    a second portion opposing a chest portion of the passenger when inflated;
    wherein a width in a lateral direction of vehicle at a boundary of said first portion and said second portion is narrower than a width in the lateral direction of the vehicle in said first portion.

2. The side impact air bag system of claim 1, wherein said air bag includes a regulating member for regulating in a lateral direction of the vehicle at said boundary.

3. The side impact air bag system of claim 1, wherein said air bag includes a gas intake portion for suppressing diffusion of the gas blown out from said gas generating device for connecting said air bag and said gas generating device, said gas intake portion being formed as a passage having a predetermined height and a predetermined length.

4. The side impact air bag system of claim 3, wherein said gas intake portion has a narrowed portion for restricting a flow of the gas blown out from said gas generating device.

5. The side impact air bag system of claim 3, wherein said predetermined height is shorter than a length of the generating device.

6. The side impact air bag system of claim 3, wherein said predetermined height is substantially the same as a length of the gas generating device.

7. A side impact air bag system having an air bag inflated between the side of a vehicle and a passenger by a gas blown out from a gas generating device, said air bag comprising:
    a first portion opposing an abdomen portion of the passenger when inflated; and
    a second portion opposing a chest portion of the passenger when inflated;
    wherein a width in a lateral direction of a vehicle in said second portion is narrower than a width in the lateral direction of the vehicle in said first portion.

8. The side impact air bag system of claim 7, wherein an upper portion of said second portion at a side away from said gas generating device in a longitudinal direction of the vehicle is shifted towards said gas generating device by a predetermined length relative to an end of said first portion at a side away from said gas generating device in the longitudinal direction.

9. The side impact air bag system of claim 7, wherein said air bag includes a regulating member for regulating a width in the lateral direction of the vehicle at said second portion.

10. The side impact air bag system of claim 7, wherein said air bag includes a gas intake portion for suppressing diffusion of the gas blown out from said gas generating device for connecting said air bag and said gas intake portion, said gas intake portion being formed as a passage having a predetermined height and a predetermined length.

11. The side impact air bag system of claim 10, wherein said gas intake portion includes a narrowed portion for restricting a flow of the gas blown out from said gas generating device.

12. The side impact air bag system of claim 10, wherein said predetermined height is shorter than a length of the gas generating device.

13. The side impact air bag system of claim 10, wherein said predetermined height is substantially the same as a length of the gas generating device.

* * * * *